(12) United States Patent
Guo

(10) Patent No.: US 9,272,412 B2
(45) Date of Patent: Mar. 1, 2016

(54) WORKPIECE TRANSFER DEVICE

(71) Applicant: HON HAI PRECISION INDUSTRY CO., LTD., New Taipei (TW)

(72) Inventor: Ming-Lung Guo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 45 days.

(21) Appl. No.: 14/086,985

(22) Filed: Nov. 22, 2013

(65) Prior Publication Data

US 2014/0161576 A1 Jun. 12, 2014

(30) Foreign Application Priority Data

Dec. 11, 2012 (TW) ............................. 101146484 A

(51) Int. Cl.
*B25J 9/04* (2006.01)
*B25J 9/10* (2006.01)

(52) U.S. Cl.
CPC ................ *B25J 9/041* (2013.01); *B25J 9/1035* (2013.01)

(58) Field of Classification Search
CPC ............. B25J 9/041; B25J 9/1035; B25J 9/04
USPC ............ 74/490.07–490.09; 414/158, 226.05, 414/749.1–749.5, 589–591
See application file for complete search history.

(56) References Cited

U.S. PATENT DOCUMENTS

| 4,604,027 A * | 8/1986 | Becker et al. ............... 414/749.1 |
| 5,527,390 A * | 6/1996 | Ono ........................ C23C 16/54 |
| | | 118/719 |
| 5,609,463 A * | 3/1997 | Kobayashi et al. ........... 414/675 |
| 8,690,213 B2 * | 4/2014 | Harada et al. ............... 294/119.1 |
| 2003/0000322 A1 * | 1/2003 | Nagai et al. .................. 74/89.36 |
| 2008/0023293 A1 * | 1/2008 | Uratani et al. ............. 198/346.2 |

* cited by examiner

*Primary Examiner* — Ernesto Suarez
*Assistant Examiner* — Ronald Jarrett
(74) *Attorney, Agent, or Firm* — Novak Druce Connolly Bove + Quigg LLP

(57) ABSTRACT

A workpiece transfer device includes a base, a rotating portion rotatably mounted on the base, and a transfer mechanism mounted on the rotating portion. The transfer mechanism includes a rotational housing, at least one bearing table, and a driving device. The bearing table is received in the rotational housing. The bearing table is configured to support a workpiece. The driving device is operable to drive the bearing table to slide in the rotational housing.

1 Claim, 6 Drawing Sheets

WORKPIECE TRANSFER DEVICE

BACKGROUND

1. Technical Field

The present disclosure relates to devices, and particularly to a workpiece transfer device.

2. Description of Related Art

To improve production efficiency, two workpieces are molded at the same time. The two workpieces are removed from the mold and placed on two shearers by a mechanical arm for shearing. However, due to a structure of the mechanical arm and the shearer, it is difficult for the mechanical arm to precisely place the workpiece into the shearers for cutting.

Therefore, what is needed is a workpiece transfer device to overcome the described shortcoming.

DETAILED DESCRIPTION

Figure 1:
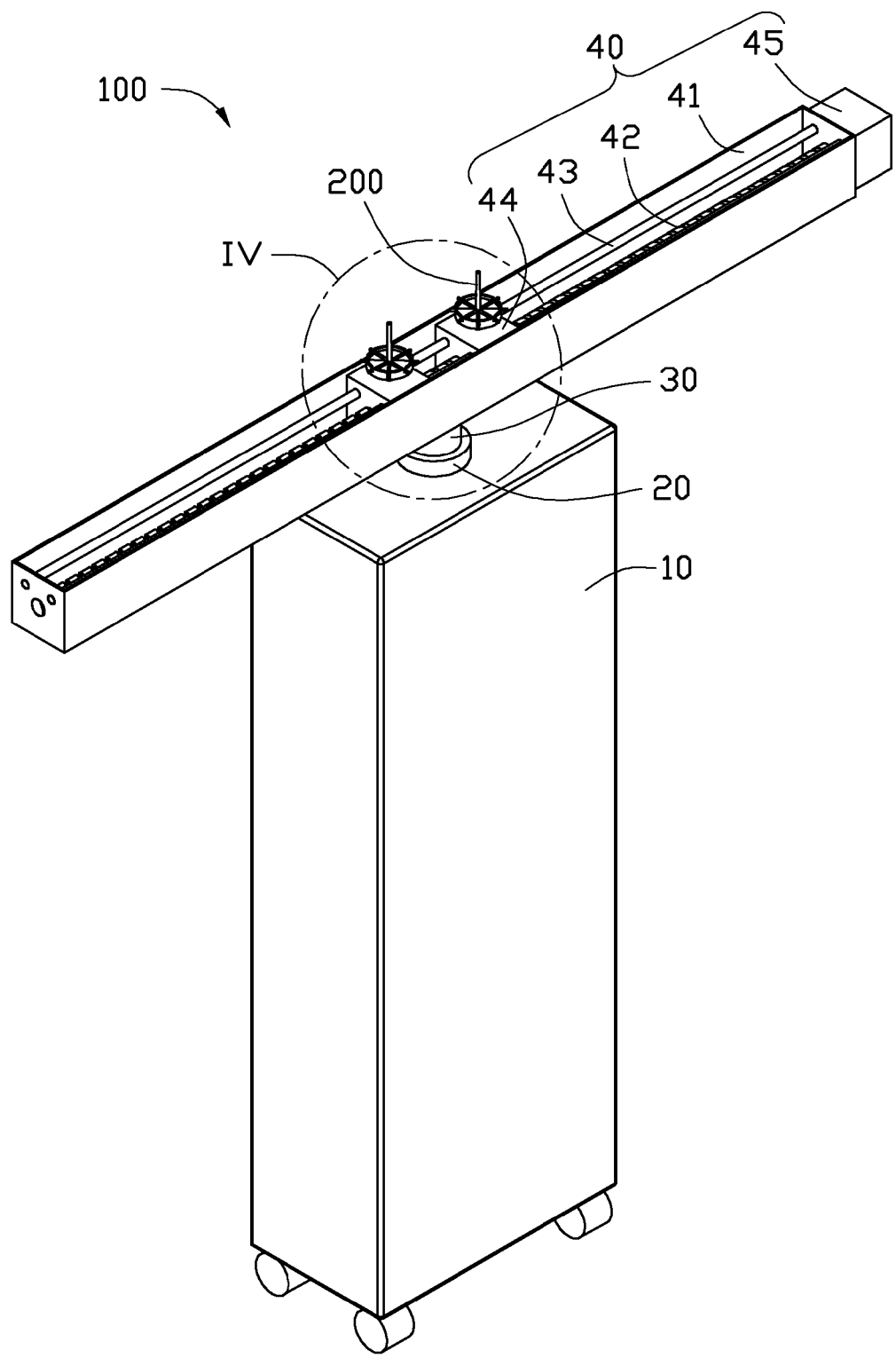
FIG. 1 is an isometric view of an embodiment of a workpiece transfer device.
Figure 2:
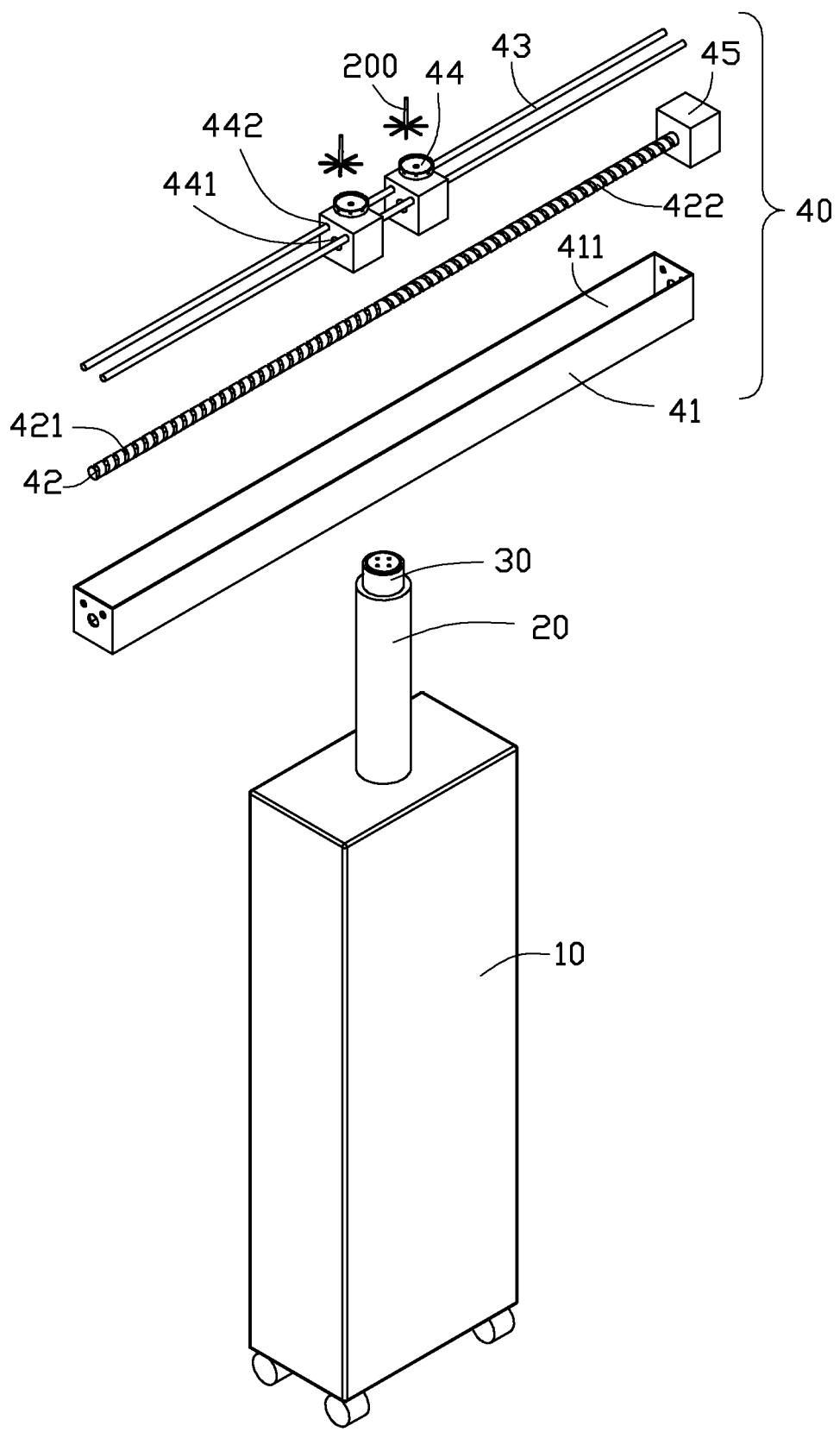
FIG. 2 is an exploded view of the workpiece transfer device of FIG. 1.

Referring to FIGS. 1 and 2, an embodiment of a workpiece transfer device 100 is used to transfer workpieces 200 to a shearer (not shown) for shearing. The workpieces 200 are removed from a mold (not shown) and placed on the workpiece transfer device 100 by a mechanical arm (not shown). The workpiece transfer device 100 includes a base 10, a support pole 20, a rotating portion 30, and a transfer mechanism 40. The transfer mechanism 40 is rotatably connected to a top end of the base 10 via the support pole 20 and the rotating portion 30. In one embodiment, the base 10 is substantially cuboid.

The support pole 20 extends from a top end of the base 10. A driving mechanism (not shown) is mounted within the base 10. The driving mechanism is operable by a user to drive the support pole 20 to extend or retract, thereby adjusting the transfer mechanism 40 to an appropriate height relative to the base 10.

Figure 3:
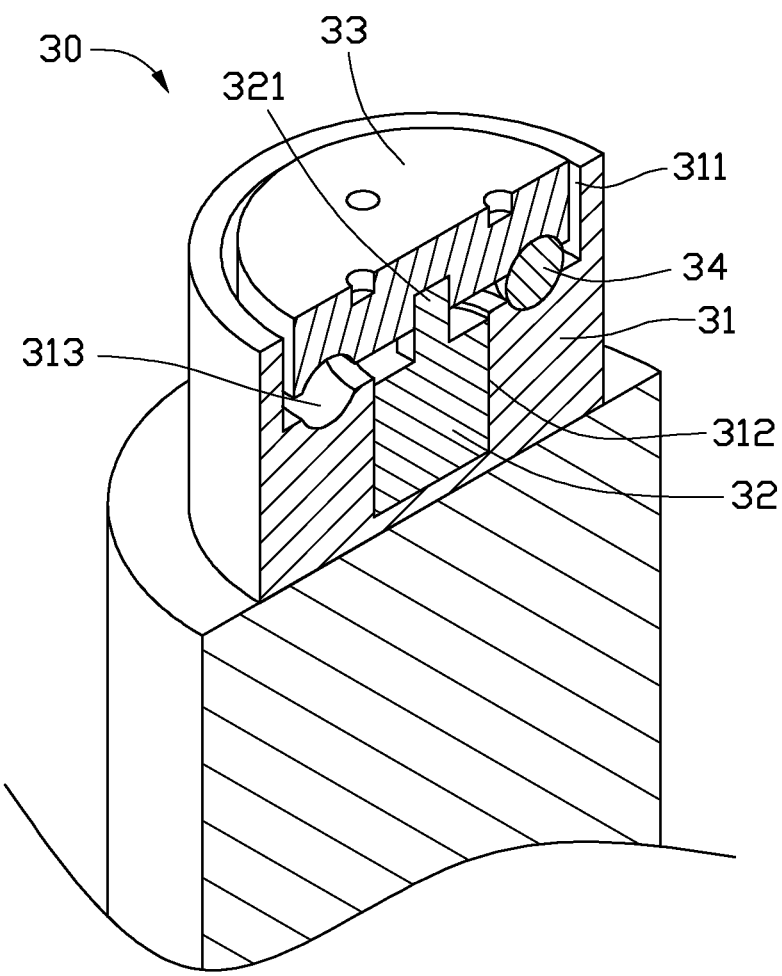
FIG. 3 is a sectional view of a rotating portion of the workpiece transfer device of FIG. 1.

Referring to FIG. 3, the rotating portion 30 is connected to an end of the support pole 20. The rotating portion 30 includes a fixing portion 31, a driving motor 32, a turntable 33, and a number of balls 34. The fixing portion 31 is fixed on the end of the support pole 20. In one embodiment, the fixing portion 31 is a cylinder. The fixing portion 31 defines a first receiving space 311 in a top end thereof. A bottom of the first receiving space 311 defines a second receiving space 312 in a center thereof. The bottom of the first receiving space 311 further defines a number of recessed portions 313 around the second receiving space 312. The driving motor 32 is received in the second receiving space 312. The turntable 33 is received in the first receiving space 311. A rotational axle 321 extends from a top of the driving motor 32. The rotational axle 321 is fixedly inserted into a bottom of the turntable 33, so that the turntable 33 can be driven by the rotational axle 321 to rotate when the driving motor 32 drives the rotational axle 321 to rotate. The balls 34 are received in the recessed portions 313 and contact the bottom of the turntable 33, so that the balls 34 reduce resistance when the driving motor 32 drives the turntable 33 to rotate.

Figure 4:
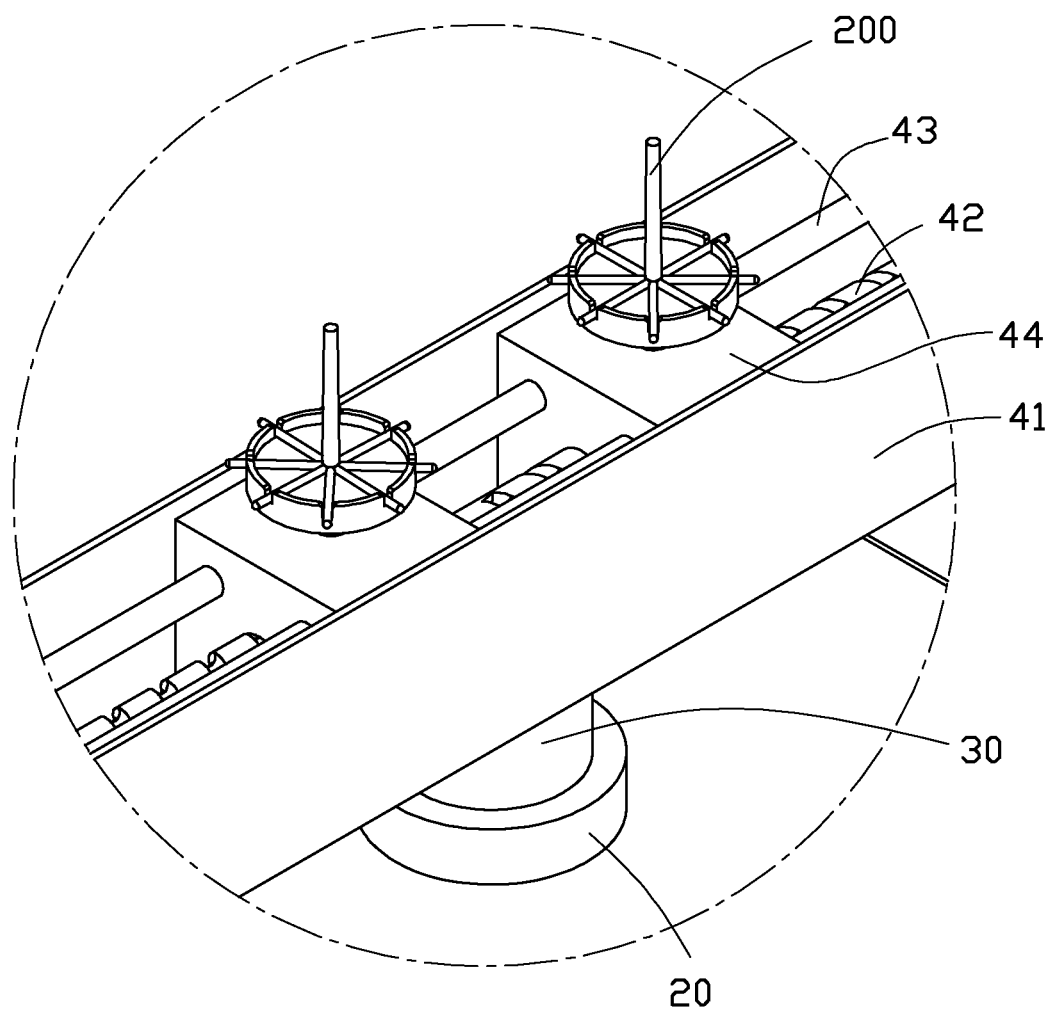
FIG. 4 is an enlarged view of a circled portion IV of FIG. 1.

Referring to FIG. 4, the transfer mechanism 40 includes a rotational housing 41, a threaded pole 42, two guide poles 43, a bearing table 44, and a driving device 45. In one embodiment, the rotational housing 41 is substantially rectangular. A substantially central portion of the rotational housing 41 is fixedly connected to the turntable 33, such that the rotational housing 41 can be driven to rotate by the turntable 33. An upper surface of the rotational housing 41 defines a receiving groove 411 along a lengthwise direction thereof. The threaded pole 42 and the guide pole 43 are fixed within the receiving groove 411. In one embodiment, a length of the threaded pole 42 and a length of the guide pole 43 are each substantially equal to a length of the receiving groove 411.

Figure 5:
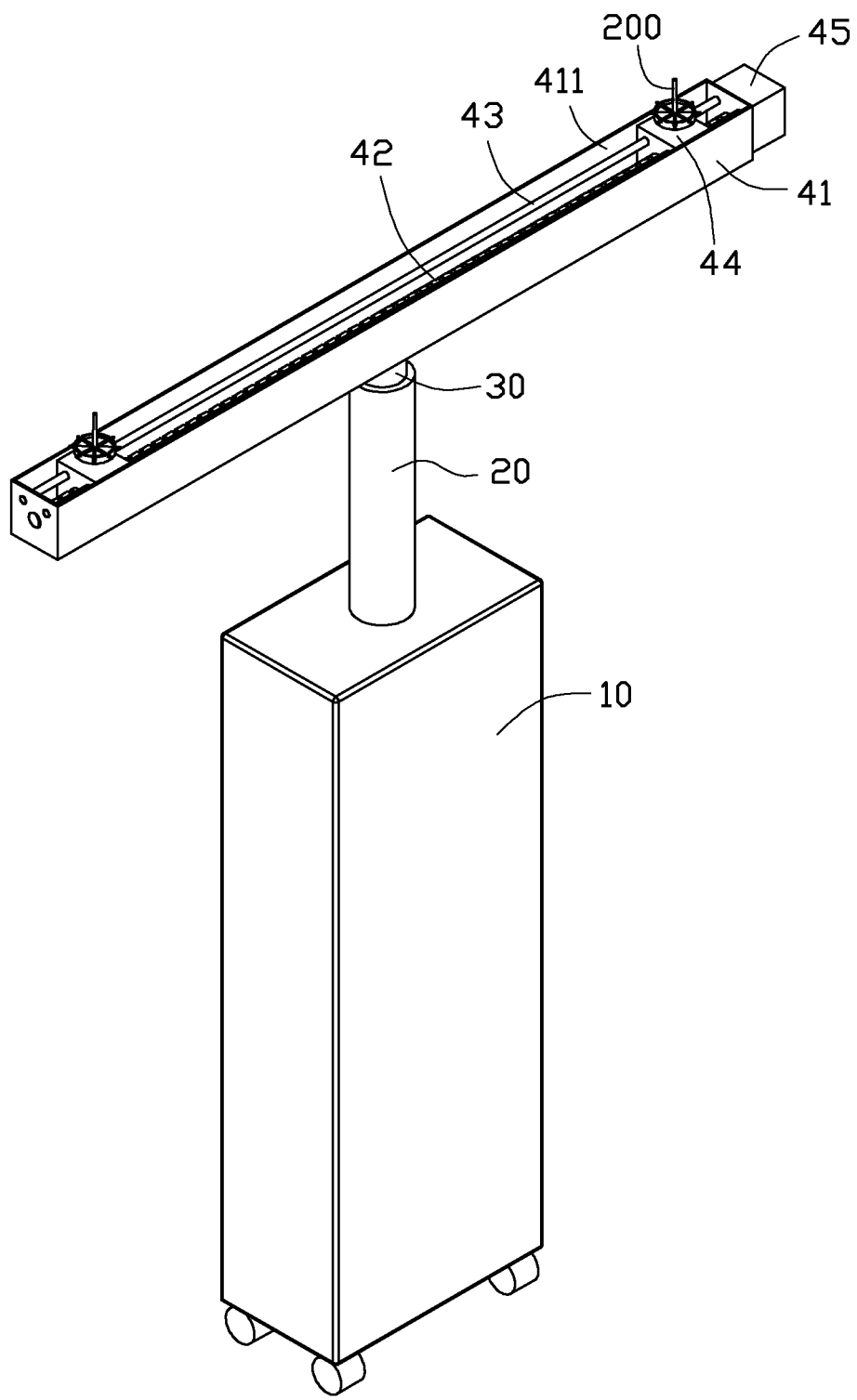
FIG. 5 shows the workpiece transfer device of FIG. 1 in a first working state.
Figure 6:
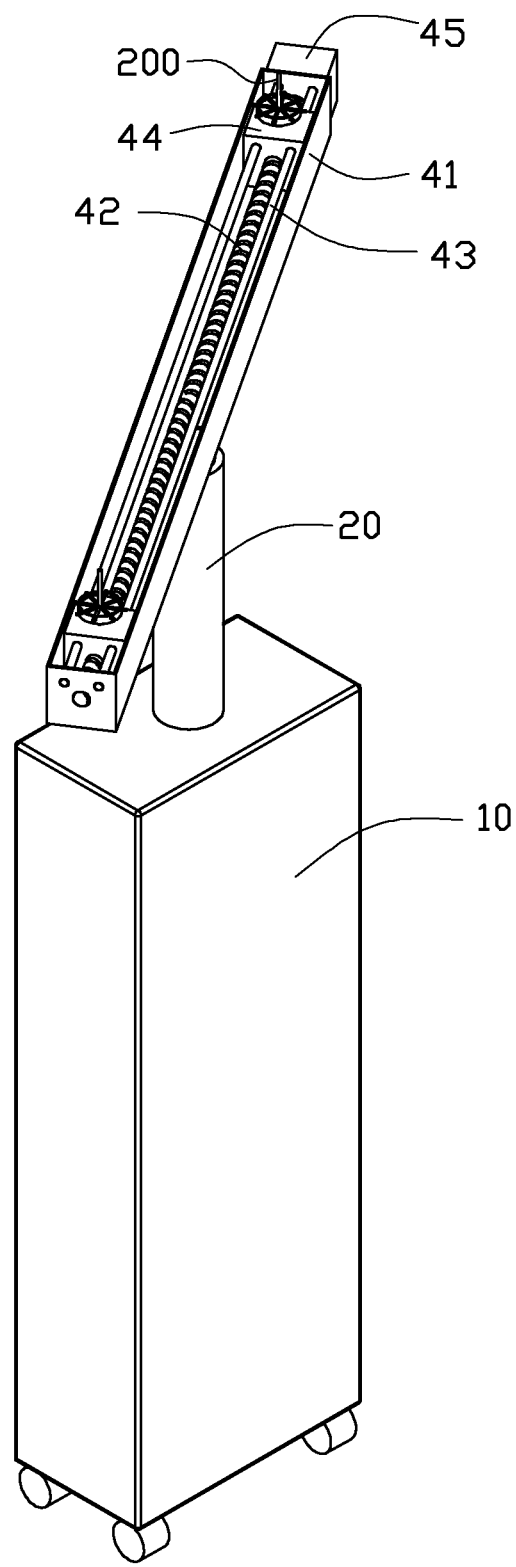
FIG. 6 shows the workpiece transfer device of FIG. 1 in a second working state.

The threaded pole 42 includes a first threaded portion 421 and a second threaded portion 422. A winding direction of the threads of the first threaded portion 421 is opposite to a winding direction of the threads of the second threaded portion 422. In one embodiment, a quantity of the bearing table 44 is two. The bearing table 44 is substantially cuboid and used to support a corresponding workpiece 200. Each bearing table 44 defines a threaded hole 441 and two through holes 442. The bearing tables 44 are received in the receiving groove 441. The threaded pole 42 is received through the threaded hole 441, and each guide pole 43 is received through a corresponding through hole 442. The driving device 45 is connected to one end of the rotational housing 41 and used to drive the threaded pole 42 to rotate. Referring to FIG. 5, because the winding direction of the threads of the first threaded portion 421 is opposite to the winding direction of the threads of the second threaded portion 422, the two bearing tables 44 are driven by the threaded pole 42 to move away or toward each other when the driving device 45 drives the threaded pole 42 to rotate.

In use, the support pole 20 is extended or retracted relative to the base 10 to adjust the transfer mechanism 40 to the appropriate height, so that the mechanical arm can precisely place two workpieces 200 on the bearing tables 44. The driving device 45 drives the threaded pole 42 to rotate, thereby driving the two bearing tables 44 to move to a predetermined position in the rotational housing 41. Thus, the workpiece transfer device 100 easily separates and positions the workpieces 200.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A workpiece transfer device comprising:
   a base;
   a rotating portion rotatably mounted on the base; and
   a transfer mechanism mounted on the rotating portion, the transfer mechanism comprising:
   a rotational housing defining a receiving groove;
   at least one bearing table received inside the receiving groove and configured to support a workpiece;
   two guide poles received inside the receiving groove, a length of each guide pole is substantially equal to a length of the receiving groove, and
   a driving device being operable to drive the at least one bearing table to slide in the rotational housing;

wherein the workpiece transfer device further comprises a support pole extendedly set in a top end of the base, the rotating portion is mounted on the support pole, and the rotating portion comprises:

a fixing portion fixed on an end of the support pole, wherein the fixing portion defines a first receiving space in a top end thereof, and a bottom of the first receiving space defines a second receiving space in a center thereof;

a driving motor received in the second receiving space, wherein a rotational axle extends from a top of the driving motor; and a turntable received in the first receiving space;

the rotational housing is mounted on the turntable, the rotational axle is fixedly inserted into a bottom of the turntable, and the driving motor is operable to drive the rotational axle and the turntable to rotate, the bottom of the first receiving space further defines a plurality of recessed portions around the second receiving space, the rotating portion further comprises a plurality of balls received in the recessed portions portion and contacting the bottom of the turntable.

* * * * *